United States Patent Office 2,952,709
Patented Sept. 13, 1960

2,952,709

PREPARATION OF DIHYDROXY DIHYDRO-NAPHTHALENE

Ted Symon, Elmhurst, Ill., assignor, by mesne assignments, to Universal Oil Products Company, Des Plaines, Ill., a corporation of Delaware No Drawing. Filed Aug. 12, 1957, Ser. No. 677,806

6 Claims. (Cl. 260—621)

This invention relates to a method for preparing substituted hydronaphthalenes, and more particularly to a method of preparing hydroxy substituted hydronaphthalenes. Still more particularly the invention relates to a process for preparing a dihydroxy dihydronaphthalene.

The oxidation inhibitors which are prepared according to the present invention are utilized per se or as intermediates in the preparation of other inhibitors which may be used for the stabilization of various organic materials which are unstable in storage, during treatment and/or in use, and include motor fuel, jet fuel, diesel oil, mineral oil, lubricating oil, fuel oil, drying oil, greases, waxes, rubber, edible fats and oils, forage crops, monomers including styrene, butadiene, isoprene, acetylenes, etc., various unsaturated alcohols, acids, ketones, etc. The aforesaid materials are adversely effected by oxygen with the resultant formation of undesirable gums, discoloration, rancidity and/or other deleterious reaction products.

The inhibitors prepared by the method of the present invention are particularly applicable to the stabilization of motor fuels and still more particularly to unsaturated gasolines including cracked gasoline, polymer gasoline, etc. In storage or during transportation and/or treatment these unsaturated gasolines tend to form undesirable gums and/or undergo discoloration. In addition the inhibitors are also applicable to the treatment of aviation gasolines which tend to undergo deterioration due to the addition of tetraethyl lead fluid or due to other components in the gasoline.

The inhibitors are also particularly applicable to the stabilization of edible and inedible fats and oils, which may be of animal, vegetable or mineral origin and which tend to become rancid especially during long periods of storage prior to use. Typical representatives of the edible fats and oils include linseed oil, menhadin oil, cod liver oil, castor oil, olive oil, rapeseed oil, coconut oil, palm oil, corn oil, sesame oil, peanut oil, babassu oil, butter, fat, lard, beef tallow, etc. It is understood that other oils and fats may be treated within the scope of this invention including oils and fats which previously had been subjected to various treatments such as blowing with air, heat treatment, hydrogenation, etc.

It is also contemplated that the inhibitors prepared according to the method of the present invention may be applied to the treatment of crops by dusting or spraying in order to preserve food excessory factors such as carotene, vitamines, various fatty acids, alcohols, etc., or that the inhibitor may be incorporated in materials which contain food products as, for example, paraffin wax which is used to coat containers for food products, cardboard or other paper products used for packaging food products, etc.

It is therefore an object of this invention to provide a novel method for preparing compounds which may be used as oxidation inhibitors.

A further object of this invention is to provide a method of obtaining a pure, colorless substituted hydronaphthalene which may be used as an oxidation inhibitor.

One embodiment of this invention resides in a process for the preparation of a dihydroxy dihydronaphthalene which comprises reacting benzoquinone with butadiene at an elevated temperature, treating the resultant compound with hydrogen bromide at an elevated temperature, and recovering the resultant dihydroxy dihydronaphthalene.

A further embodiment of the invention resides in a process for preparing a dihydroxy dihydronaphthalene which comprises reacting benzoquinone with an excess of butadiene in the presence of benzene at a temperature in the range of from about 70° to about 150° C., condensing the resultant compound and directly reacting said compound with hydrogen bromide at a temperature in the range of from about 90° to about 150° C., and recovering the resultant dihydroxy dihydronaphthalene.

A specific embodiment of the invention is found in a process for the preparation of 1,4-dihydroxy-5,8-dihydronaphthalene which comprises reacting p-benzoquinone with an excess of 1,3-butadiene in the presence of benzene at a temperature in the range of from about 70° to about 150° C., condensing the resultant compound and directly reacting said compound with a mixture of aqueous hydrogen bromide and acetic acid at a temperature in the range of from about 90° to about 150° C., and recovering the resultant 1,4-dihydroxy-5,8-dihydronaphthalene.

Other objects and embodiments will be found in the following further detailed description of the invention.

Heretofore, previous methods for preparing dihydroxy dihydronaphthalenes without isolating the quinone intermediate have resulted in products which are usually dark purple in color. The color found in the intermediate is an undesirable impurity inasmuch as said color must be removed before preparing other antioxidant compounds which may be used in the aforementioned edible fats and oils. If a white, or colorless, product was desired the prior art methods required the separation, or isolation, of the quinone intermediate thus necessitating an additional step in the preparation of the desired, pure product. In addition, the methods used for the preparation of the desired compound were carried out at room temperature in a liquid phase reaction, care being exercised to control the temperature of the reaction so that said temperature did not rise above a certain point and thus carry the reaction into a vapor phase. It has now been discovered that a pure white compound which is obtained in almost quantitative yields based on the p-benzoquinone used in the process may be obtained by reacting p-benzoquinone with an excess of butadiene at elevated temperatures and directly reacting the resultant compound with aqueous hydrogen bromide without first isolating and purifying the quinone intermediate.

In the process of this invention p-benzoquinone is reacted with a butadiene such as 1,3-butadiene at a temperature in the range of from about 65° to about 150° C., the butadiene being present in the reaction mixture in a mol ratio to the p-benzoquinone of from about 1.1:1 to about 2:1 or more, the preferred mol ratio of butadiene to p-benzoquinone being in a range of from about 1.1:1 to about 1.3:1. The resultant compound is then condensed and directly reacted with aqueous hydrogen bromide to effect isomerization and thus prepare the desired 1,4-dihydroxy-5,8-dihydronaphthalene.

In the preferred embodiment of the present invention the p-benzoquinone is dissolved in an inert organic solvent among which are aromatic hydrocarbons such as benzene, toluene, p-xylene, m-xylene, o-xylene, etc.; paraffinic hydrocarbons such as pentane, heptane, hexane, etc.; cyclic paraffins such as cyclopentane, cyclohexane, methylcyclohexane, etc., alcohols such as methyl alcohol, ethyl alcohol, propyl alcohol, etc.; or ethers such as dimethylether, diethylether, dipropylether, etc. The second step of the present reaction may also be effected in the presence of an organic diluent such as acetic acid. In the preferred embodiment of this invention the aqueous hydrogen bromide which is added to the reaction product between the p-benzoquinone and the butadiene is a 50–50 solution of aqueous hydrogen bromide and glacial acetic acid, said mixture being added in small increments in order that the temperature will not rise too rapidly.

The 1,4-dihydroxy-5,8-dihydronaphthalene thus prepared may be used as an oxidation inhibitor per se, or may be used as intermediates in the preparation of monoalkyl ethers of the dihydroxynaphthalene, such ethers including 1-hydroxy-4-methoxy-5,8-dihydronaphthalene, 1-hydroxy-4-ethoxy-5,8-dihydronaphthalene, 1-hydroxy-4-propoxy-5,8-dihydronaphthalene, etc. In addition, other oxidation inhibitors which may be prepared from the intermediate of the present invention include 1-hydroxy-4-methoxy-5,6,7,8 - tetrahydronaphthalene, 1-hydroxy-4-ethoxy-5,6,7,8-tetrahydronaphthalene, etc.

The process of this invention may be effected in any suitable manner and may comprise either a batch or a continuous type operation. When a batch type operation is used a quantity of the benzoquinone along with the organic solvent are placed in an appropriate apparatus such as a stainless steel bomb which is then sealed. The butadiene is then introduced in the vapor phase through a valve into the bomb after which the valve is closed and the bomb is heated to a temperature of about 65° C. Upon reaching this temperature the reaction becomes exothermic and heating is discontinued. The temperature rises to about 100–130° C. during this exothermic reaction. After the exothermic reaction has subsided the bomb and contents thereof are heated at a temperature of about 95° C. for an additional period of time ranging from about 1 to about 4 hours or more. Upon completion of the desired residence time the bomb and contents thereof are cooled to room temperature and, if so desired, transferred to another apparatus provided with stirring and heating means. If so desired an organic diluent such as acetic acid is added after which the mixture is stirred vigorously and a 50–50 mixture of aqueous hydrogen bromide and acetic acid are added in small increments until a temperature of about 95° C. has been reached. The reaction is continued at this temperature for an additional period of time after which the flask and contents thereof are cooled to room temperature and the reaction product, comprising a pure white compound is recovered by conventional means such as fractional distillation, crystallization, etc.

The process of this invention may also be effected in a continuous type operation in which the p-benzoquinone dissolved in the organic solvent is continuously charged to a reaction zone which is maintained at the proper operating conditions of temperature and pressure. The butadiene is also continuously charged to the reactor through separate means. The reactor may comprise an unpacked vessel or coil or may be lined with an adsorbent packing material such as fire brick, alumina, dehydrated bauxite and the like. At the end of the desired residence time the reaction product is continuously withdrawn from the reactor, separated from the reactor effluent and charged to a second reaction zone where it is reacted with aqueous hydrogen bromide under controlled conditions of temperature and pressure, the reactor effluent being separated and recycled as a portion of the starting materials. Upon completion of this reaction the desired product is continuously withdrawn, separated from reactor effluent and purified by conventional means hereinbefore set forth.

The following examples are given to illustrate the process of the present invention, which, however, are not intended to limit the generally broad scope of the present invention in strict accordance therewith.

*Example I*

162 g. (1.5 mol) of p-benzoquinone and 105 cc. of benzene were placed in a stainless steel bomb and sealed therein. 97 g. (1.7 mol) of butadiene were introduced through a valve in the vapor phase. Upon completion of the addition of the butadiene the valve was closed and the bomb heated to a temperature of about 65° C. At this point the reaction became exothermic in nature and the temperature rose to 100–130° C. without additional outside heating. Upon cessation of the exothermic reaction, heating was continued for an additional two hours at a rate sufficient to maintain the bomb at a temperature of 100° C.

At the end of the aforementioned two hours the bomb and contents thereof were cooled to room temperature and the reaction mixture was transferred to a flask equipped with a mechanical stirrer. 120 cc. of acetic acid was added, the mixture stirred vigorously and small increments of a 1:1 solution of 48% aqueous hydrogen bromide and glacial acetic acid mixture were added until the temperature reached 110° C. The reaction mixture was then cooled, filtered, washed with cold benzene and dried, 235 g. of a pure, white reaction product being recovered, comprising a 96.6% yield of 1,4-dihydroxy-5,8-dihydronaphthalene, based on the p-benzoquinone used in the reaction.

*Example II*

162 g. (1.5 mol) of p-benzoquinone and 105 cc. of benzene were sealed in a stainless steel bomb and 97 g. (1.7 mol) of butadiene in the vapor phase was introduced through a valve. Upon completion of the addition of the butadiene the valve was closed and the bomb was heated to approximately 65° C. As in the previous example an exothermic reaction took place at this temperature, the temperature rising to 100–130° C. Upon completion of the exothermic reaction, heating was continued for an additional 2 hours at a rate sufficient to maintain the temperature of the bomb at 100° C.

The reaction mixture and the bomb were then cooled to room temperature and the mixture transferred to a flask provided with a mechanical stirrer. 120 cc. of acetic acid was added and the mixture was stirred vigorously. Small increments of a 1:1 solution of 48% aqueous hydrogen bromide and glacial acetic acid mixture was slowly added until the temperature reached 95° C. Upon completion of the residence time the reaction mixture was cooled, filtered, washed with cold benzene and dried. 237 g. of a pure, white reaction product consisting of 1,4-dihydroxy-5,8-dihydronaphthalene, the product comprising a 97.5% yield based on the p-benzoquinone used, was recovered.

*Example III*

To illustrate the importance of a molar excess of butadiene in the reaction mixture another experiment was performed. 108 g. (1.0 mol) of p-benzoquinone and 70 cc. of benzene were sealed in a bomb. 58 g. (1.0 mol) of butadiene in the vapor phase were pressured in through a valve, the valve was closed and the bomb heated to a temperature of 65° C. An exothermic reaction occurred at this temperature, the temperature rising to about 100° C. The bomb and contents were cooled to room temperature and transferred to a flask. 80 cc. of acetic acid was added to the mixture, after which small increments of a 1:1 solution of 48% aqueous hydrogen bromide and glacial acetic acid were slowly added, the temperature rising to about 90° C.

The reaction mixture was cooled, filtered, washed with cold benzene and dried. The desired product, which was purple in color consisted of 127 g. corresponding to a 77.5% yield of 1,4-dihydroxy-5,8-dihydronaphthalene based on the p-benzoquinone used in the reaction.

I claim as my invention:

1. A process for the preparation of a dihydroxy dihydronaphthalene which comprises forming a reaction mixture of benzoquinone and butadiene in a mol ratio of butadiene to benzoquinone of from about 1.1:1 to about 1.3:1, subjecting said mixture to reaction at a temperature of from about 70° to about 150° C., directly reacting the resultant product with hydrogen bromide at a temperature in the range of from about 90° to about 150° C., and recovering the resultant dihydroxy dihydronaphthalene.

2. A process for the preparation of a dihydroxy dihydronaphthalene which comprises forming a reaction mixture of benzoquinone and butadiene in a mol ratio of butadiene to benzoquinone of from about 1.1:1 to about 1.3:1, subjecting said mixture to reaction at a temperature of from about 70° to about 150° C. in the presence of an organic diluent, directly reacting the resultant product with hydrogen bromide at a temperature in the range of from about 90° to about 150° C., and recovering the resultant dihydroxy dihydronaphthalene.

3. The process of claim 2 further characterized in that said diluent comprises benzene.

4. The process of claim 2 further characterized in that said diluent comprises toluene.

5. A process for the preparation of 1,4-dihydroxy-5,8-dihydronaphthalene which comprises reacting butadiene with p-benzoquinone in a mol ratio of from about 1.1:1 to about 1.3:1 at a temperature of from about 70° to about 150° C., directly reacting the resultant product with a mixture of aqueous hydrogen bromide and acetic acid at a temperature of from about 90° to about 150° C., and recovering the resultant 1,4-dihydroxy-5,8-dihydroxynaphthalene.

6. A process for the preparation of 1,4-dihydroxy-5,8-dihydronaphthalene which comprises reacting butadiene with p-benzoquinone in a mol ratio of from about 1.1:1 to about 1.3:1 in the presence of benzene at a temperature in the range of from about 70° to about 150° C., condensing the resultant compound and directly reacting said compound with a mixture of aqueous hydrogen bromide and acetic acid at a temperature in the range of from about 90° to about 150° C., and recovering the resultant 1,4-dihydroxy-5,8-dihydronaphthalene.

References Cited in the file of this patent

UNITED STATES PATENTS

| | | |
|---|---|---|
| 1,891,168 | Leuttringhaus et al. | Dec. 13, 1932 |
| 1,967,862 | Carothers et al. | July 24, 1934 |
| 2,475,288 | Ladd | July 5, 1949 |